(No Model.)

W. J. HADDEN & J. S. WOOD.
DISINFECTING APPARATUS.

No. 279,644. Patented June 19, 1883.

WITNESSES:
A. Schehl.
Otto Risch.

INVENTOR
Walter J. Hadden
Joseph S. Wood
BY
Paul Goepel.
ATTORNEY

UNITED STATES PATENT OFFICE.

WALTER J. HADDEN, OF NEW YORK, AND JOSEPH S. WOOD, OF BROOKLYN, N. Y.

DISINFECTING APPARATUS.

SPECIFICATION forming part of Letters Patent No. 279,644, dated June 19, 1883.

Application filed April 14, 1883. (No model.)

*To all whom it may concern:*

Be it known that we, WALTER J. HADDEN, of the city, county, and State of New York, and Joseph S. Wood, of Brooklyn, Kings county, State of New York, citizens of the United States, and residents as aforesaid, have invented certain new and useful Improvements in Evaporating and Disinfecting Apparatus, of which the following is a specification.

This invention has reference to an improved apparatus for evaporating chemical and medicinal substances in such a manner that large spaces can be quickly charged with the vapors of these substances, so as to form a protection against zymotic diseases and for other purposes.

The invention consists of an exterior steam-generating tank adapted to be heated, hermetically-closed vessels that are located at the interior of the tank and charged with the chemical or medicinal substances to be vaporized, and means whereby the interior vessels are connected with each other, with the exterior tank, and with the atmosphere, as will more fully appear hereinafter and finally be pointed out in the claims.

Figure 1:
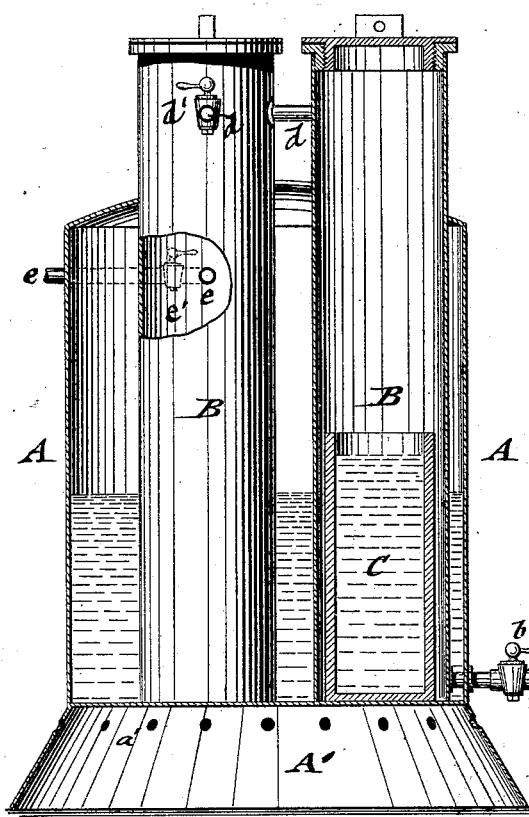
Figure 2:
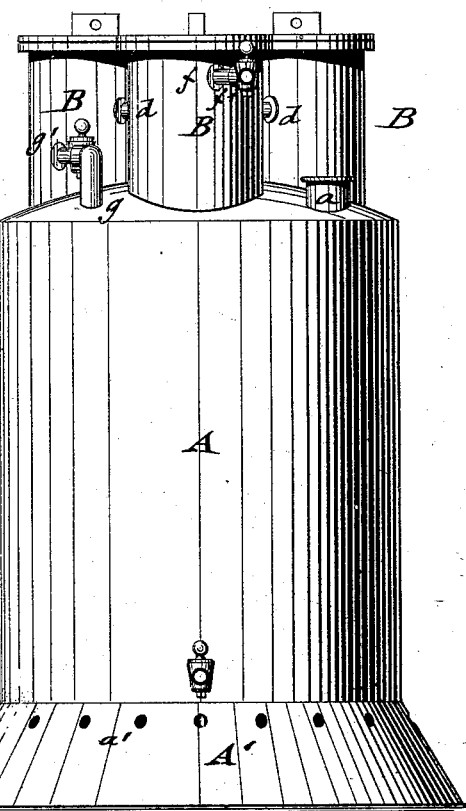
Figure 3:
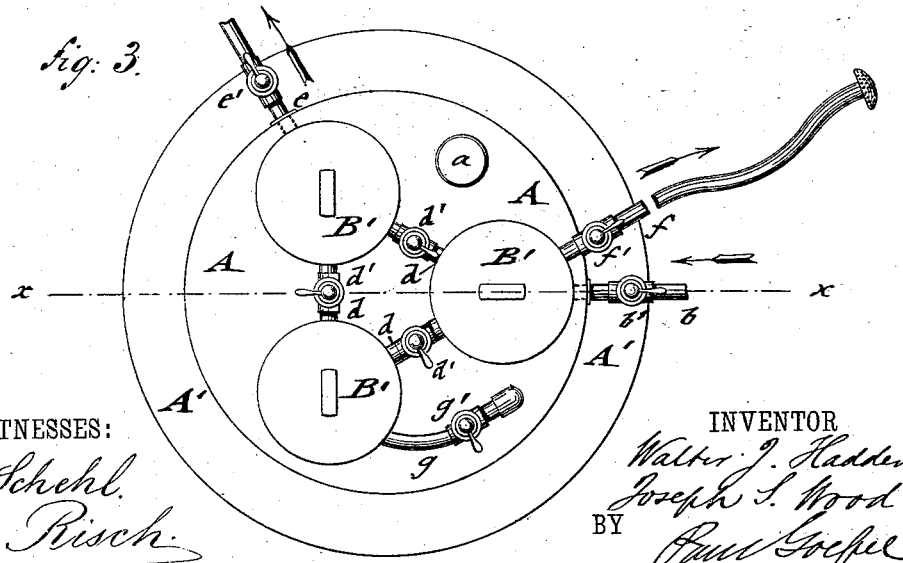

In the accompanying drawings, Figure 1 represents a vertical central section on line $x$ $x$, Fig. 3, of our improved evaporating and disinfecting apparatus. Fig. 2 is a side elevation, and Fig. 3 a plan of the same.

Similar letters of reference indicate corresponding parts.

A in the drawings represents a closed exterior tank, of cylindrical shape, which is partly filled with water through a top opening, and then closed by a tightly-fitting screw-plug, $a$. Steam is generated in the tank A by any suitable source of heat, that is arranged below the bottom of the tank, the lower part, A', of the same being made flaring and provided with ventilating-holes $a'$. In the interior of the tank A are arranged one or more cylindrical vessels, B B, which are hermetically closed by removable lids B'. In the interior of the vessels B cylindrical glass cups C are arranged for receiving the chemical and medicinal substances to be evaporated. One of the cylindrical vessels B B is connected at its bottom part by a pipe, $b$, having a stop-cock, $b'$, to the outside, and also at the upper part with the other vessels B B by connecting-pipes $d$, having stop-cocks $d'$. One of the vessels B is further arranged with a discharge-pipe, $e$, having a stop-cock, $e'$, as shown clearly in Figs. 1 and 3. Besides the pipe-connections by which the vessels B B are placed in communication with each other, one of them is also connected at its upper part with the atmosphere by a pipe, $f$, having a stop-cock, $f'$. One of the vessels B is further connected by a pipe, $g$, having stop-cock $g'$, with the tank A, whereby steam may be admitted to one or all of the vessels B, and thereby the contents of the same placed under the same steam-pressure as that in the tank.

According to the connections described, the apparatus may be used for different purposes, first, for atomizing and vaporizing purposes, in which case the chemical ingredients are placed into the vessels B B, and are then heated to a certain temperature by the heat of the steam formed in the tank A. They are then allowed to escape through the pipe $f$, which is provided with a spray-nozzle, so as to permeate the atmosphere of the room in which the apparatus is situated.

When constructed on a smaller scale the apparatus can also be used as an inhaler, in which case a proper mouth-piece for the throat, lungs, or ears is applied to the end of the pipe $f$.

For disinfecting purposes a rubber hose of suitable length is applied to the discharge-pipe $f$, and conducted through the rooms to be disinfected and provided with discharge spray-nozzles for the proper distribution of the vapors in the rooms.

The apparatus can also be used for impregnating the water of medical baths with medicinal substances, in which case the pipes $b$ and $e$ are used, and the stop-cocks $d'$ $d'$ of the connecting-pipes $d$ $d$ are opened, so that the water can be conducted from the outside through all the vessels B and discharged into the bath-tub through pipe $e$. In its passage through the vessels B the water is united with the fluids in the same and with the vapors that have been generated therein by the heat of the steam in the tank. The tank A, as well as the vessels B, may be provided with safety-valves when constructed on a larger size and exposed to high pressure.

The apparatus may further be used for deodorizing, decolorizing, and for other appliances in the arts, as well as for the treatment and prevention of zymotic diseases and for other purposes.

Having thus described our invention, we claim as new and desire to secure by Letters Patent—

1. An evaporating and disinfecting apparatus composed of a closed exterior tank, A, adapted to be heated, and interior vessels, B, having lids B', which may be hermetically closed, said vessels being respectively connected by valved pipes $d$ with each other, by a valved pipe, $f$, to connect with the atmosphere, and by a valved pipe, $g$, with the tank or boiler proper, substantially as and for the purpose set forth.

2. An evaporating and disinfecting apparatus consisting of a closed exterior tank, A, adapted to be heated, interior vessels, B, having lids B', which may be hermetically closed, valved pipes $b$ and $e$ for supplying and discharging water to and from the vessels B, and valved-pipe connections $d$ $d$ between the vessels B, substantially as and for the purpose specified.

In testimony that we claim the foregoing as our invention we have signed our names in presence of two subscribing witnesses.

WALTER J. HADDEN.
JOSEPH S. WOOD.

Witnesses:
PAUL GOEPEL,
SIDNEY MANN.